Oct. 1, 1935.                R. PERRIN                2,015,691
                    TREATMENT OF METALS WITH SLAGS
                       Filed Oct. 25, 1933
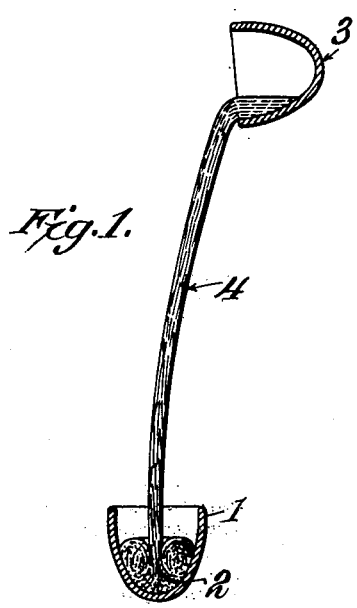
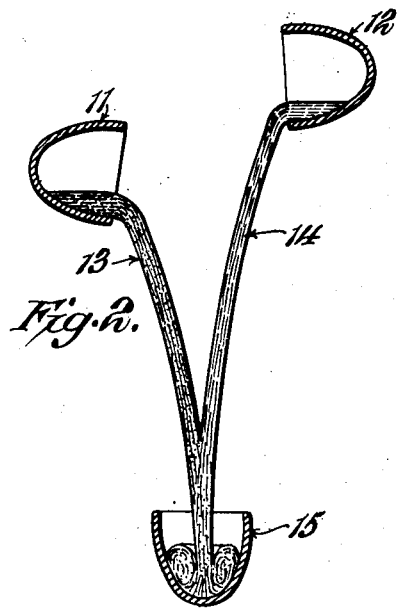
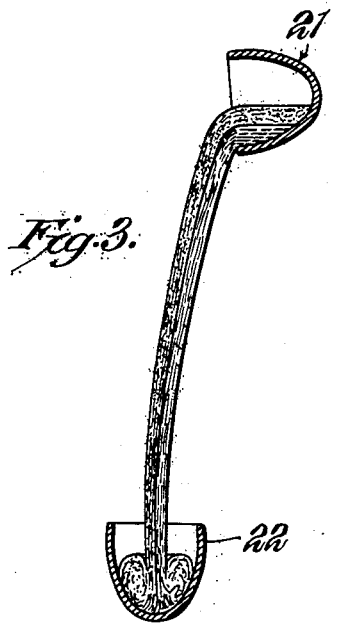
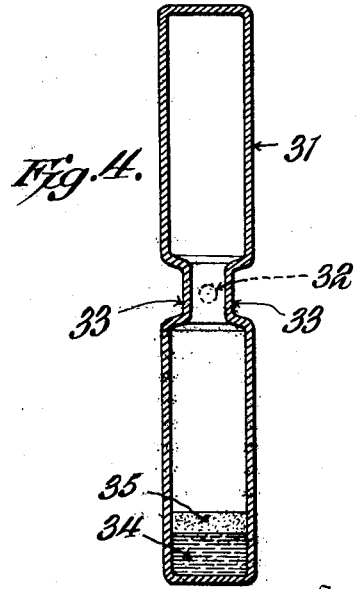
Inventor,
Rene Perrin,
By Maurot Lewis,
Attorneys.

Patented Oct. 1, 1935

2,015,691

UNITED STATES PATENT OFFICE 2,015,691

TREATMENT OF METALS WITH SLAGS

René Perrin, Paris, France, assignor to Societe d'Electrochimie d'Electrometallurgie et des Acieries Electriques d'Ugine, Paris, France, a corporation of France Application October 25, 1933, Serial No. 695,194
In Germany July 1, 1931

35 Claims. (Cl. 75—27)

The present invention relates to the treatment of metals with slag, and more especially to the deoxidation of ferrous metals with slag.

The deoxidation of steel is a basic problem in the manufacture of steel, the quality of the steel made being directly influenced by the degree of reduction obtained. One may say, in this connection, that apart from dephosphorization and desulphuration, the general problem attending the manufacture of steel limits itself to the elimination of dissolved oxides and the inclusion of the smallest possible non-metallic oxidized contents, such as inclusions of alumina, silicates or titanates, for example, remaining in suspension and occluded upon solidification taking place.

The solution of this problem requires that only a very small quantity of dissolved FeO and MnO should be contained in the bath at the moment when the usual addition of Al, Si, Ti are made thereto; otherwise the said additions would reduce the oxides, thus producing insoluble compounds introducing them into the product. These considerations have given rise to two main groups of processes for the manufacture of sound metal:

1. Processes based upon the use of pure raw materials, wherein it is sought to oxidize the bath to the minimum degree previous to final treatments, i. e., processes calling for the use of the Martin acid furnace, of the single fusion electric furnace, of the crucible, or of the high frequency furnace, said processes resolving the problem by eliminating the difficulty to be overcome.

2. Processes involving heavy initial oxidation of the steel, i. e., processes based upon the use of the Thomas furnace, the Martin basic furnace or of the electric refining furnace, and which deal with any, and therefore cheap, raw materials. In the latter alternative, according to the apparatus used, a more or less complete deoxidation is effected before the usual deoxidation agents are added, the quality of the resulting products varying owing to this and improving, in progression, from the Thomas process to the electric furnace treatment.

Products of high quality can, however, only be obtained at the cost of protracted and expensive treatments.

In the case of hard steels deoxidation is brought about before addition partly by means of the added carbon and the boiling of the CO, and partly by the dissolving action of the slag. In that of extra mild steels, deoxidation is secured solely by means of slag, the dissolving action of which gradually eliminates, by diffusion, the FeO dissolved in the bath. The slag acts upon the surface of the metal wherewith it is in immediate contact, by arriving at a state of equilibrium with the same, oxide of iron is diffused from lower layers towards the surface, and if care be taken constantly to deoxidize the slag, it is possible, at the expense of considerable delay, continuously to withdraw oxide from the bath. An extreme example of this process is that known as the carburizing slag, electric furnace process.

In the case of carburized steels, deoxidation is brought about by the action of carbon as well as that of the slag. Carbon deoxidation has the disadvantage that the effect of the added carbon is irregular, a portion being converted into CO and the remainder being dissolved in the metal where it is in part oxidized into CO by the slag during the remaining time required for the operation.

It is therefore manifest that, hitherto, a simple, quick and economical method has been lacking by means of which the greater part of the FeO and MnO dissolved in the steel may be eliminated and, starting with an oxidized metal, a sufficiently deoxidized metal may very quickly be obtained for the final additions of Si, Al, Ti, etc., to cause therein a minimum of inclusions of the solid oxidation products of the Si, Al, Ti, etc., and a minimum of dissolved oxides, i. e., a metal the quality of which is comparable, for example, to that produced in the electric furnace.

It is an object of this invention to furnish a particularly simple and quick means to attain this end.

In accordance with my process, the molten steel is thoroughly intermixed with a fluid slag which extracts iron and manganese oxides from the steel. The mixing is carried out in such a way that the slag is thoroughly and quickly intermixed with the whole body of the molten steel in a finely divided or dispersed condition. This is preferably accomplished by a violent impact of the molten steel upon the slag whereby not only is the slag broken up into small particles and dispersed into the steel, but the mass of steel and dispersed slag is given a violent churning or turbulence, insuring the rapid and thorough distribution of the finely dispersed slag throughout the mass of the metal. This is preferably accomplished, as hereinafter more particularly described, by causing a rapidly moving stream or body of molten steel to violently impinge against and into a body of very fluid slag.

The slag employed for deoxidizing steel in accordance with my process is an acid slag containing a relatively large amount of an acidic substance, such as $SiO_2$ or $TiO_2$, which will combine with the bases FeO and MnO and which has a high extracting power for removing the iron and manganese oxides dissolved in the steel. In other words, a slag is employed such that there is a state of disequilibrium between the oxides dissolved in the metal and the slag. The intermixing of the slag and steel should be violent and rapid enough to bring about quickly an intimate contact of very large surface area, because of the breaking up of the slag into fine particles, between the slag and metal, resulting in allowing the concentrations of the manganese and iron oxides in the metal and in the slag rapidly to approach a state of equilibrium thus causing a quick transfer of the iron and manganese oxides from the metal into the slag.

The effect of the impact of the metal against the slag may be aptly described as a turbulent emulsification of the fluid slag and molten metal. Not only is there a tremendously large surface area created between the slag and the metal which permits quick transfer of the oxides across the interfaces between the metal and slag particles, making the reaction very rapid, but since the slag and metal are in a condition of violent turbulence or churning, the slag is thoroughly disseminated and hence caused to act immediately upon all portions of the metal, as contrasted, for example, with the usual deoxidizing furnace operation in which the slag remains as a layer upon the top of the steel bath, so that the deoxidizing action of the slag can be exerted only over the relatively small interfacial area between the slag and metal layers, and in which the equilibriums of oxide concentrations within the bodies of the metal and slag layers must take place slowly by diffusion.

The total time required for such thorough and intimate emulsification or dispersion of the slag throughout the body of the metal is very short, usually in the neighborhood of about 1 minute for pouring 15,000 kilograms of steel. As soon as the turbulence or churning about of the slag and metal in the mixing container ceases, the slag and metal, which are both in a fluid condition, separate by gravity, leaving the metal substantially free from slag and in a condition to be immediately poured into ingot molds.

In the drawing,—

Figures 1, 2, 3 and 4 are diagrammatic views showing examples of procedures by which such violent intermixing and thorough dispersion of the slag into the metal may be accomplished.

Referring to Figure 1 of the drawing, reference numeral 1 indicates a container, illustrated as a ladle, in which is placed a molten fluid slag capable of extracting the soluble oxides from the steel and in which the intimate mixing of the slag and steel occurs. This body of slag is indicated at 2. The slag is heated to a highly fluid condition, being preferably heated to about 25 or 30 degrees centigrade above the temperature of the steel to be poured into it. As an illustrative example, 1,750 kilograms of slag may be employed for about 15,000 kilograms of steel. After the molten fluid slag is put into the ladle 1 a charge of molten steel is poured rapidly into the ladle 1 from a container holding the steel, illustrated as a ladle 3. The ladle 3 is positioned far enough above the ladle 1 so that the stream of steel 4 strikes against the slag with considerable violence, as an illustrative example, a charge of 15,000 kilograms of steel is poured from a height of about 10 feet in about 1 minute or less. This rate of pouring furnishes a fairly thick stream of steel which falls with considerable force against and into the slag in the lowermost ladle 1. The kinetic energy of the falling stream of steel causes a breaking-up and intimate admixture of steel and slag as the steel impinges against the slag. As the stream of steel hits the slag, not only is there an intimate mixing, which is believed to be in the nature of an emulsification or fine dispersion of the slag into the steel, but there is a violent churning or turbulence of the contents of the ladle, resulting in an immediate intimate and thorough distribution of the dispersed slag in the mass of metal.

This turbulent condition rather quickly subsides due to the frictional dissipation within the mass of the energy of turbulence, whereupon there occurs a rapid and thorough gravity separation of the steel from the slag, resulting in a bath of metal in the bottom of the ladle which is freed from the slag and in a condition to be immediately tapped from the ladle into the ingot molds. The very fluid condition of the slag not only permits its dispersion or emulsification with the metal in separated finely divided particles, but allows a thorough and rapid gravity separation of slag and metal. It is to be understood that the example of pouring 15,000 kilograms of steel from a height of about 10 feet in about 1 minute is illustrative as typical, and that the height and rate of pouring may be varied. For example, the metal may be poured more slowly, say, from a height of 20 feet, with similar results. In every case, however, the steel should be poured from a sufficient height so that there is a violent impact of the steel into the slag sufficient to cause a violent, quick and intimate admixture of slag and steel to take place.

While I prefer to pour the molten steel into a container previously charged with the molten slag, as shown in Figure 1, the intermixing may be otherwise accomplished. For example, in Figure 2 there are illustrated two ladles 11 and 12 for holding slag and steel, respectively, and from which a stream of slag and stream of steel are poured simultaneously into a receiving and mixing ladle 15. The ladle containing the steel should, of course, be elevated sufficiently above the receiving ladle so that the stream of steel will strike into the receiving ladle with sufficient impact to cause the violent, quick and intimate intermixing of the steel and slag.

In Figure 3 there is illustrated another example in which a container, such as a ladle, 2, is initially charged with a bath of steel having a supernatant layer of molten fluid slag. The pouring ladle 21 is elevated above a receiving ladle 22 and the contents poured into the receiving ladle. The charge should be poured from a sufficient height so that there is a violent intermixing and dispersion of slag and steel due to the arrested kinetic energy of the falling charge. If desired, an arrangement of two ladles, such as shown in Figure 3, may be employed for pouring the charge back and forth a number of times to secure repeated intermixing of the slag and steel. For example, the ladles 21 and 22 may be mounted on suitable elevating mechanisms whereby one ladle may be elevated, say, a distance of 10 to 20 feet above the other and the charge poured, and then the emptied pouring ladle is lowered and the full receiving ladle is raised and the charge repoured back into the first ladle.

While for simplicity in illustration I have shown ladles as the containers for pouring and receiving the slag and steel, other suitable containers may be employed. For example, in Figure 1 the steel may be poured or tapped directly from the melting furnace into a ladle or other container placed a suitable distance below it. Also, instead of employing the ladle 1 as a mixing vessel, a previously heated open top furnace may be employed. Similarly, in Figures 2 and 3 furnaces or other suitable containers may be employed instead of the ladles illustrated.

In Figure 4 there is diagrammatically illustrated an arrangement of a single vessel by which a violent intermixing of slag and steel may be accomplished. As illustrated in Figure 4, a relatively long closed container 31, preferably having the general shape illustrated, is trunnioned to be turned about an axis 32. It will be understood, of course, that the drawing is diagrammatic and that the container will be provided with suitable lining and preferably with insulation. The container 31 is preferably provided with restricting portions 33 which serve somewhat as dams to control the discharge of metal and slag from the top to the bottom of the container as the container is inverted. A charge of molten steel 34 and slag 35 is put into the container 31. The container is then quickly inverted and its movement quickly stopped in the vertical inverted position. As the container is being swung into its inverted position, the dam 33 tends to hold back the metal and tends to allow the slag to first fall into the then lower part of the container, to be followed by metal which plunges into the slag. Also, the inertia of the metal will tend to retain the metal into the then upper part of the inverted container from which it falls by gravity into the then bottom part of the container where there is a violent impact of steel with slag to cause a thorough intermixing of the two. As an illustrative example, the container 31 may be 10 to 20 feet in length and may be given several rapid inversions per minute.

While I have illustrated and described specific forms of apparatus for carrying out my process, it is to be understood that the invention is not limited thereto, as the thorough intermixing might be otherwise accomplished. However, in all cases there must be a quick and intimate dissemination or dispersion of the slag in a finely divided condition into the steel of the character obtainable by causing such violent impact that the bodies of slag and steel are broken up and mutually and thoroughly disseminated one into the other.

As above noted, in order to secure effective intermixing or dispersion of the slag and steel, the slag should be in a fluid condition, and it is also essential that the slag be very fluid in order to permit the gravity separation of the metal from the slag after the deoxidizing operation.

*Composition of the slag*

For deoxidizing purposes the slag should have a high power of extracting the iron and manganese oxides which are in solution in the steel. For this purpose the slag should contain a relatively large amount of some substance, such as $SiO_2$ or $TiO_2$ which are acidic toward FeO and MnO and which will combine therewith. On account of cheapness it is preferred to render the slag acid with a relatively large amount of silica. The slag should contain free $SiO_2$. For effective deoxidation the slag should be as acid as possible so that the free FeO and MnO in the slag are reduced to a minimum. The stronger the acidity, the more intense is the deoxidation effect of the slag. However, a slag containing a very high proportion of silica is a viscous slag. It is therefore necessary to combine with the silica, agents which will render the silicious slag fluid at the temperature of the molten steel. The addition of lime, CaO, will make a silicious slag more fluid. The addition of any considerable amount of lime will, however, too greatly decrease the acidity of the slag. The usual acid slags contain a considerable proportion of iron oxide which tends to render them fluid. However, in the present case the slag should be poor in iron oxide. Therefore, the problem has been to render the slag fluid at the temperature of the molten steel and at the same time not undesirably impair its acidity or raise its iron oxide content.

I have found that the use of alumina, or alumina together with magnesia or lime, in a slag poor in FeO, will give the necessary fluidity without undesirably impairing the acidity of the slag. Synthetic slag suitable for the process may be made by combining 45 to 65% silica, 4 to 25% alumina, 4 to 25% magnesium oxide, and 4 to 25% calcium oxide. Magnesia may be used as the fluidification agent alone or in combination with alumina or an alkali oxide or an alkaline earth oxide. From 3 to 25% of soda, in the form of soda or its salts, or of cryolite, as well as potash, magnesia and baryta, or its salts, with or without alumina additions, may be used to increase the fluidity of the slag. Boric acid in the form of boric acid or its salts increases the fluidity of the slag while maintaining its acidity.

Titania ($TiO_2$) is particularly effective in imparting great fluidity to the slag without decreasing its acidity. $TiO_2$ acts as an acid in combining with FeO and MnO. The titania may therefore be substituted for a considerable portion of the silica, if desired, particularly if it is desired not to have silicon introduced into the metal from the slag. The titania may be used in varying amounts from 5 to 80% of the slag.

Zirconia may also be employed for the purpose of increasing the fluidity of the slag.

The addition of these agents is not so much for lowering the melting point of the slag, as it is for rendering the slag fluid at the temperature of the molten steel. The desideratum is high fluidity of the slag at the temperature of the molten steel, rather than a low melting point.

The slag must have to a high degree the ability of extracting or absorbing from the steel the oxides of iron and manganese which are dissolved in the steel. For this purpose the slag should be relatively poor in FeO. For a slag containing silica below 60% and not containing $TiO_2$, the FeO content should preferably be below 4%, but I usually have less than 2%. The permissible amount of FeO is dependent upon a number of factors, such as the composition of the slag, the degree to which it is desired to deoxidize the steel, the carbon content of the steel, the amount of slag, etc., so that no absolute percentage limit can be very well fixed for the FeO. In general, the more acid the slag, the more FeO can be tolerated. Also, the addition of $TiO_2$ will allow a larger amount of FeO in the slag. The slag must, however, be always relatively poor in iron oxide, and by this I mean that the iron oxide in the slag must be sufficiently low so that the slag has the capacity to extract iron oxide from the steel to be deoxidized.

Manganese oxide combines with silica with much less dis-association of MnO than does FeO. Therefore, the MnO content of the slag may be considerably higher than its FeO content, even up to 30% MnO in some slags containing little or no FeO or other bases. The MnO should, however, be low enough so that the slag has the ability to extract MnO from the steel to be deoxidized.

If desired, for purposes of economy, the slags may be regenerated by treating them in a furnace with reducing agents for removing FeO and MnO from the slag to render the slag available for further deoxidation of steel. Certain regenerating processes are described and claimed in my co-pending application Serial No. 658,278, filed February 23, 1933.

By way of typical examples I may cite the following:

*Example No. 1*

1,750 kilograms of molten fluid slag was poured onto a ladle, the slag having the following analysis:

| | Per cent |
|---|---|
| $SiO_2$ | 58.20 |
| $Al_2O_3$ | 15.80 |
| MgO | 18 |
| CaO | 2.80 |
| MnO | 4.80 |
| FeO | 0.4 |

Onto this slag was poured from a height of about 10 feet in 50 seconds time, 15,000 kilograms of steel of the following analysis:

| | Per cent |
|---|---|
| C | 0.06 |
| Mn | 0.02 |
| Si | 0.015 |

Immediately afterward the steel was poured into ingot molds. The analysis of the ingots was as follows:

| | Per cent |
|---|---|
| C | 0.06 |
| Mn | 0.03 |
| Si | 0.075 |

Only 0.012% of aluminum was used in the ingot molds to obtain a steel which settled in the mold without bubbling and shrunk in the usual way under charcoal with a hot top on the ingot mold, which demonstrated a thorough deoxidation of the metal. The percentage of aluminum added, as indicated above, was very much less than that usually added to an electric steel of similar grade whose manufacture requires a long deoxidizing operation involving also the addition of 0.4% silicon.

*Example No. 2*

1,200 kilograms of slag was run into a ladle in a molten condition, the slag having the following analysis:

| | Per cent |
|---|---|
| $SiO_2$ | 68.20 |
| $Al_2O_3$ | 11.92 |
| CaO | 8.08 |
| MnO | 4.19 |
| FeO | 0.25 |
| $Na_2O$ | 7.00 |

Upon said slag was run 14,000 kilograms of iron of the following analysis:

| | Per cent |
|---|---|
| C | 0.020 |
| Si | 0.010 |
| Mn | 0.025 |

This metal was therefore equivalent to the mildest irons manufactured industrially, said mildness having been obtained at the cost of super-refining, which had of course simultaneously super-oxidized the iron. The metal was poured from a height of several feet into the slag for a period of 70 seconds. The metal was then cast in several ingot molds, increasing additions of aluminum being made in the successive ingot molds. Immediately 0.06% aluminum was added, the metal lay quiet in the mold and shrunk with the usual piping under charcoal, indicating perfect deoxidation for a steel of this nature.

*Example No. 3*

An extra mild steel was made having the following analysis:

| | Per cent |
|---|---|
| C | 0.050 |
| Si | 0.010 |
| Mn | 0.042 |

The metal was carburized to 0.475% by additions of anthracite in an open bath, without slag being formed or any deoxidizing agent whatever being applied.

14,000 kilograms of this metal was poured from a height of several feet into a ladle containing 1,200 kilograms of slag having the following composition:

| | Per cent |
|---|---|
| $SiO_2$ | 70 |
| $Na_2O$ | 25 |
| CaO | 5 |

Ingots were immediately cast, with increasing additions of aluminum. Immediately the minute proportion of 0.010% of aluminum was added, the steel lay perfectly quiet in the mold beneath the charcoal.

*Example No 4*

As a typical example of a slag containing $TiO_2$, I may cite the following slag and analysis:

| | Per cent |
|---|---|
| $SiO_2$ | 52 |
| $TiO_2$ | 19 |
| $Al_2O_3$ | 12 |
| MnO | 9 |
| CaO | 5 |
| FeO | 3 |

The amount of slag used may be varied from the proportions given in the examples. In general, the greater the volume of the slag, the higher the permissible amounts of FeO and MnO in the slag. Also, in general, the greater the amount of slag, the more complete is the deoxidation.

*Additions of manganese or the like to the steel before deoxidation*

I have found that the deoxidation process may be improved by the addition to the steel before the slag deoxidizing treatment of a metal, such as manganese or chromium, which is capable of being oxidized at the expense of the oxide of iron in the steel and the oxide of which is soluble in the steel in such a manner as not to cause inclusions, even if the steel to be deoxidized contains some manganese or chromium. Any other metal may be used provided the oxide thereof—like that of manganese and chromium—has a heat of formation with respect to the molecule of oxygen higher than that of FeO and is soluble to some extent in the steel.

Before the addition of such metal, the oxygen contained in the steel is in the form of oxides of iron and manganese dissolved in the steel. After the addition of such metal, a portion of the oxygen, which was in the state of FeO, passes into the form of oxides of the metal M thus added in accordance with the equilibrium reaction:

$$\beta FeO + \alpha M \rightleftarrows M\alpha O\beta + \beta Fe$$

The more that the metal M has been added to the steel before deoxidizing with the slag, the more, in view of this equilibrium reaction and the law of mass action, there will be formed oxides of this metal $M\alpha O\beta$. The quantity of FeO dissolved in the oxidized steel will thus have been diminished and there will be formed instead the oxide of the metal M added. Iron has a higher capacity for dissolving iron oxide than oxides of such metals as manganese and chromium. When the oxidized steel is treated with the slag in accordance with my process, the slag will thus carry away a greater total quantity of oxygen as FeO and $M\alpha O\beta$ than it would have done in the form only of FeO, without the previous addition of the metal M. Therefore, on account of this addition there will be a more complete deoxidation of the steel.

As the metal M to be added to the steel before the deoxidizing by slag, there may be considered any metal not causing inclusions. The addition of a metal causing inclusions would be without interest since it is by the process of mixing the oxidized steel with a fused slag that the oxide inclusions in the steel are diminished. The metals M which are to be added are preferably manganese or chromium, usually manganese.

Another phenomenon is produced if the deoxidation is effected with a slag containing a substantial amount of silica. In this case, in fact, the more intense deoxidation of the steel will be manifest by virtue of the equilibrium reaction:

$$2FeO + Si \rightleftarrows SiO_2 + 2Fe$$

by a reduction of a part of the silica in the slag, and silicon will be introduced in the steel during the extremely short time required for deoxidation.

The increase in the quantity of the metal M which is added to the steel before the steel is deoxidized by the slag will thus result in this case not only in a final diminution of the FeO, but also in an increase in the quantity of silicon introduced into the steel during the deoxidizing process.

By way of an example of carrying out the process, there was poured about 13,000 kilograms of steel with carbon of 0.10 to 0.12% and a content of silicon below 0.03%, into about 1,500 kilograms of slag of the composition 60% $SiO_2$, 20% MgO and 20% $Al_2O_3$, so as to secure intimate mixing of the slag and steel as described above.

Manganese was added to this steel before treating with the slag, but for each casting operation the quantity of manganese added varied each time accoording to the table below. This table gives the results obtained after each operation of deoxidizing with the slag and of casting. In the second column is given the amount of manganese added before deoxidizing. In the third column is given the quantity of silicon introduced in the steel from the slag in the deoxidizing process. In the fourth column is given the quantity of aluminum which was necessary in order to quiet the steel:

| | Mn added before deoxidizing | Si introduced into the metal | Percentage of Al necessary to obtain quieting |
|---|---|---|---|
| 1st operation | 0 | 0.025 | 0.020 |
| 2nd operation | 0.200 | 0.055 | 0.017 |
| 3rd operation | 0.400 | 0.065 | 0.010 |
| 4th operation | 0.650 | 0.063 | 0.008 |
| 5th operation | 0.880 | 0.095 | 0.008 |
| 6th operation | 1.350 | 0.150 | 0 |

This table shows quite clearly and accounting for small inevitable variations (the absolute identity of two successive operations not being possible to guarantee), that the addition of progressive quantities of Mn to the steel before intensive mixing with an acid slag produces the two following consequences:

1. Diminution of the quantity of aluminum necessary for killing the steel.
2. Progressive parallel increase of the content of silicon in the metal after deoxidation with the slag.

Higher amounts of silicon, such as 0.275%, have been introduced in this manner in other tests on higher carbon steels. The addition of silicon in this manner has an advantage over introducing silicon in the usual way as ferrosilicon, in that it does not have any tendency to cause segregation of the silicon or silicate inclusions. The reduction of the silicon from the slag is an indication of the very complete deoxidation of the steel.

The amount of the added metal, such as manganese, may be varied, depending principally upon the amount of the metal which it is desired to have remain in the finished steel. In general, I prefer to add about 0.5 to 0.8% manganese above that which it is desired to have remain in the steel. In general, the greater the amount of slag, the less the amount of manganese required.

The use of the metal, such as manganese, effects a considerable improvement in the process, since the addition of a sufficient amount of manganese before the deoxidizing operation results in a considerable decrease in the amount of oxygen remaining in the steel, even to the point where additions of aluminum, titanium, or the like, for completely killing the steel, may be dispensed with.

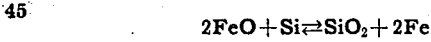

*Recarburization before deoxidation*

In practice, the steel to be deoxidized is very often a super-oxidized steel with a low content of carbon. This is particularly so in the case of overblown Thomas steel in which the content of carbon is in the neighborhood of 0.03 to 0.05%. On the other hand, the finished product to be obtained is very often a steel with a higher content of carbon varying from 0.08% in the case of extra mild steels, up to 1.5% in the case of hard tool steels. It is therefore necessary, in such case, to recarburize, which may be effected by the usual methods, such as by the addition of carbon, cast iron, Spiegel, ferro-manganese, or other substances containing carbon.

I have found that it is advantageous in using my deoxidizing process to recarburize the steel prior to deoxidizing it with the slag. In my deoxidizing process the final content of oxides in the steel might depend, among other things, upon the content of oxides in the steel being treated with the deoxidizing slag. It is therefore of great advantage that the oxygen content should be reduced as low as possible before the treatment with the slag, and this can be accomplished by recarburizing before deoxidizing, since the recarburizing reduces the content of oxides by the following reactions:

FeO+C→CO+FE and MnO+C→CO+Mn with evolution of CO until the solution pressure of the CO does not exceed the pressure above the bath.

This has been demonstrated in a number of castings by causing by recarburization the content of carbon in a super-oxidized extra mild steel to vary before the deoxidation by the slag, using about 750 kilograms of slag to 14,000 kilograms of steel. The results obtained are shown below, the final degree of oxidation of the metal after deoxidizing having been approximately measured by the amount of aluminum necessary to kill the steel in the ingots poured.

These results show, in particular, a very great variation in the effect obtained, according as to whether the operation is started with a super-refined steel with 0.035% carbon for instance, or whether the steel has been previously recarburized to contents of from 0.08 to 0.10% carbon—the lowest practical contents for extra mild steels. These results thus show the great advantage of carrying out the recarburizing before deoxidizing by my process:

| Content of carbon before deoxidizing | Amount of aluminum required for killing the steel |
|---|---|
| Percent | Percent |
| 0.035 | 0.100 |
| 0.060 | 0.070 |
| 0.080 | 0.040 |
| 0.100 | 0.020 |
| 0.475 | 0.010 |

Accurate tests for total oxygen have entirely confirmed these conclusions.

As in any case where it is necessary to recarburize before casting, the influence of recarburizing before deoxidizing, not only on the quantity of the finishing agents required, but also on the quantity of slag to be used and the final quality of the steel, is obvious.

While my process has been described with specific reference to the deoxidation of steels and low carbon irons, it may be used for deoxidizing ferro-alloys and other high melting point metals. The application of the process as applied to the deoxidation of ferro-alloys is described and claimed in my copending application Serial No. 658,276, filed February 23, 1933. An application of the process for the deoxidizing and purifying of copper is described and claimed in my copending application Serial No. 666,758, filed April 18, 1933. The process in its broader aspects may be employed in the treatment of high melting point metals where it is desired to have an extraction of undesirable elements from the metal into the slag or an interchange of elements between the slag and metal. For example, the steel may be dephosphorized by causing a violent and thorough dissemination of a dephosphorizing slag into the steel, as described and claimed in my copending application Serial No. 695,195, filed of even date herewith, as a continuation in part of my copending applications Serial No. 584,584, filed January 2, 1932, and Serial No. 658,275, filed February 23, 1933.

Other applications of the process of treating metals with various slags in accordance with the mechanical operations herein described of causing the violent and thorough intermixing of metal and slag, are described and claimed in my copending applications Serial No. 666,759, filed April 18, 1933, for the refining of crude copper; Serial No. 658,278, filed February 23, 1933, for treatment of slags; Serial No. 658,277, filed February 23, 1933, for manufacture of iron alloys; and Serial No. 658,279, filed February 23, 1933, for manufacture of iron alloys.

The present application contains claims directed specifically to the process of deoxidizing steels by my slag treatment, and also generic claims for such mechanical treatment to include other applications of the process. It is to be understood, therefore, that while I have described the present invention with particular reference to its application in the deoxidizing of steel, the invention in its broader aspects is not so limited, but may be otherwise embodied and practiced within the scope of the following claims.

The present application is a continuation in part of my copending applications Serial No. 584,583, filed January 2, 1932; Serial No. 656,038, filed February 9, 1933; Serial No. 658,274, filed February 23, 1933; and Serial No. 658,271, filed February 23, 1933.

The process herein referred to, whereby slags after use in a deoxidizing operation are regenerated and re-used, is fully described and claimed in my copending application, Serial Number 727,177, filed May 23, 1934, and in other copending applications whereof said application Ser. No. 727,177 is a continuation-in-part.

The process herein referred to of using titanic acid as a fluidifying agent is fully described and claimed in my copending applications Serial Number 658,271, filed February 23, 1933, and Serial Number 719,589, filed April 7, 1934.

I claim:

1. The process of treating metal with slag, which comprises causing an impact of a body of molten metal with a body of fluid molten slag with such violence as to cause one to be dispersed into the other in a finely divided condition and form a turbulent mass of intimately intermixed slag and metal in order to bring about a speedy and intimate admixture of slag and metal and thereby quickly effect the desired reaction between the slag and metal, and allowing the metal to separate from the slag.

2. The process of treating metal with slag, which comprises forming a bath of molten metal, forming a bath of fluid molten slag, pouring the metal into the slag from a sufficient height and with sufficient rapidity to cause one to be intimately dispersed into the other in a finely divided condition and form a turbulent mass of intimately intermixed slag and metal, and allowing the turbulence to subside and the metal to separate from the slag.

3. The process of treating metal with slag, which comprises causing intimate and speedy intermixing of a molten metal and a fluid molten slag, by pouring the molten metal from a sufficient height and with sufficient rapidity to make violent impact against and to commingle quickly with the slag, and allowing gravity separation of the metal and slag.

4. The process of treating metal with slag, which comprises causing a body of molten metal to fall against a body of fluid molten slag from a height sufficient to cause an impact violent enough to secure immediate and intimate admixture of the metal and slag and thereby quickly bring about the desired reaction between them, and allowing the metal to separate from the slag.

5. The process of treating metal with slag, which comprises forcibly bringing together a mass of molten metal and a mass of fluid molten slag in such manner as to form a turbulent mixture thereof in a finely divided condition, thereby quickly effecting the desired reaction between the slag and metal, and allowing the metal to separate from the slag.

6. The process for improving the mechanical properties of a metal containing impurities, which comprises energetically intermixing said metal with a previously molten very fluid slag of such character that it will extract from said metal the greater part of the impurities which lessen its mechanical properties, the intermixing being effected by bringing the molten metal and molten slag together with such violent intensity that it will cause a speedy and intimate mixture in the nature of an emulsion of the slag and metal, and separating the slag from the metal.

7. The process of deoxidizing steel, which comprises forming a molten bath of the steel to be deoxidized, forming a bath of fluid molten acid slag relatively poor in iron oxide, causing an impact of the molten steel with the molten slag with such violence as to cause one to be dispersed into the other in a finely divided condition and to form a turbulent mass of intimately intermixed slag and metal in order to bring about a speedy and intimate admixture of slag and metal and thereby quickly effect the deoxidation of the steel, and allowing the steel to separate from the slag.

8. The process of deoxidizing steel, which comprises forming a molten bath of the steel to be deoxidized, forming a bath of fluid molten acid slag relatively poor in iron oxide, and intermixing the slag and steel with such intensity and intimacy as to bring about immediately a substantially complete deoxidation of the steel.

9. The process of deoxidizing steel, which comprises forming a turbulent mass of the molten steel to be deoxidized, and a fluid molten acid slag relatively poor in iron oxide, intermixed in a finely divided condition, and thereby quickly effecting the deoxidation of the steel, and allowing the steel to separate from the slag.

10. The process of deoxidizing steel, which comprises forming a molten bath of the steel to be deoxidized, forming a bath of fluid molten acid slag relatively poor in iron oxide containing a substantial amount of alumina as a fluidifying agent, and intermixing the slag and steel with such intensity and intimacy as to bring about quickly a substantially complete deoxidation of the steel.

11. The process of deoxidizing steel, which comprises forming a turbulent mass of the molten steel to be deoxidized and a fluid molten acid slag relatively poor in iron oxide and containing alumina as a fluidifying agent, intermixed in a finely divided condition, and thereby quickly effecting the deoxidation of the steel, and allowing the steel to separate from the slag.

12. The process of deoxidizing steel, which comprises forming a molten bath of the steel to be deoxidized, forming a bath of fluid molten acid slag relatively poor in iron oxide containing a substantial amount of titanium oxide as a fluidifying agent, and intermixing the slag and steel with such intensity and intimacy as to bring about quickly a substantially complete deoxidation of the steel.

13. The process of deoxidizing steel, which comprises forming a turbulent mass of the molten steel to be deoxidized and a fluid molten acid slag relatively poor in iron oxide and containing titanium oxide as a fluidifying agent, intermixed in a finely divided condition, and thereby quickly effecting the deoxidation of the steel, and allowing the steel to separate from the slag.

14. The process of deoxidizing steel, which comprises forming a molten bath of the steel to be deoxidized containing less carbon than that desired in the finished steel, recarburizing the steel, forming a bath of fluid molten acid slag relatively poor in iron oxide, quickly intermixing the molten recarburized steel and molten slag with sufficient intensity to bring about an immediate deoxidation of the steel, and allowing the steel to separate from the slag.

15. The process of deoxidizing steel, which comprises forming a molten bath of the steel to be deoxidized containing less carbon than that desired in the finished steel, recarburizing the steel, forming a molten fluid acid slag relatively poor in iron oxide, forming a turbulent mass of the molten recarburized steel and fluid molten slag intermixed in a finely divided condition and thereby quickly effecting the deoxidation of the steel, and allowing the steel to separate from the slag.

16. The process of deoxidizing steel, which comprises forming a molten bath of the steel to be deoxidized containing less carbon than that desired in the finished steel, recarburizing the steel, forming a fluid molten acid slag relatively poor in iron oxide, causing an impact of a body of the molten steel with a body of the fluid molten slag with such violence as to cause one to be dispersed into the other in a finely divided condition and form a turbulent mass of intimately intermixed slag and steel in order to bring about a speedy and intimate admixture of the slag and steel and thereby quickly effect the deoxidation of the steel, and allowing the steel to separate from the slag.

17. In the manufacture of purified steel by violently intermixing with the steel a finely divided previously molten slag capable of extracting oxides from the steel the intermixture being effected with such violence as to disperse the slag in a very finely divided state within the steel and form therewith a mixture in the nature of an emulsion, the step of recarburizing the steel before the violent intermixture of the molten slag therewith.

18. In the manufacture of purified steel by violently intermixing with the steel a previously molten slag in a finely divided state capable of extracting oxides therefrom, the step which consists in recarburizing the steel before the slag is violently intermixed with the steel, the recarburization being carried to such an extent that the correct content of carbon in the steel is reached when the steel is ready for casting without any other addition of carbon.

19. A process for the manufacture of purified steel from an oxidized steel which consists in preparing a molten fluid slag capable of dissolving and extracting from the steel oxides dissolved therein; recarburizing the steel to such an extent as to reduce substantially the amount of oxides dissolved in the steel; violently intermixing the said slag with the steel for such a period of time as to obtain a virtual equilibrium between the slag and the steel as concerns the oxides extraction power of the slag and the dissolving power of the steel towards the oxides to be extracted from the steel; and then separating the slag from the steel.

20. The process of deoxidizing steel, which comprises forming a molten bath of the steel to be deoxidized, adding to the steel manganese in excess of that desired in the finished steel, forming a fluid molten acid slag relatively poor in iron oxide, quickly intermixing the molten steel and molten slag with sufficient intimacy to bring about a quick deoxidation of the steel, and allowing the steel to separate from the slag.

21. The process of deoxidizing steel, which comprises forming a molten bath of the steel to be deoxidized, adding manganese to the steel in excess of that desired in the finished steel, forming a fluid molten acid slag relatively poor in iron oxide, forming a turbulent mass of the molten steel and molten slag intermixed in a finely divided condition and thereby quickly effecting the deoxidation of the steel, and allowing the steel to separate from the slag.

22. The process of deoxidizing steel, which comprises forming a molten bath of the steel to be deoxidized, adding manganese to the steel in excess of that desired in the finished steel, forming a fluid molten acid slag relatively poor in iron oxide, causing an impact of the molten steel with the molten slag with such violence as to cause one to be dispersed into the other in finely divided condition and form a turbulent mass of intimately intermixed slag and steel in order to bring about a speedy and intimate admixture of the slag and steel and thereby quickly effect the deoxidation of the steel, and allowing the steel to separate from the slag.

23. The process of deoxidizing steel, which comprises forming a molten bath of steel to be deoxidized, forming a bath of fluid molten acid slag relatively poor in iron oxide and containing an oxide of the class consisting of oxides of alkali-metals, alkaline-earth metals and magnesium as a fluidifying agent, and intermixing the slag and steel with such intensity and intimacy as to bring about quickly a substantially complete deoxidation of the steel.

24. The process of deoxidizing steel, which comprises forming a turbulent mass of the molten metal to be deoxidized and a fluid molten acid slag relatively poor in iron oxide and containing an oxide of the class consisting of oxides of alkali-metals, alkaline-earth metals and magnesium, intermixed in a finely divided condition, and thereby quickly effecting the deoxidation of the steel, and allowing the steel to separate from the slag.

25. The process of deoxidizing steel, which comprises forming a molten bath of steel to be deoxidized, adding to the steel a metal of the class consisting of manganese and chromium in excess of that desired in the finished steel, forming a fluid molten acid slag relatively poor in iron oxide, quickly intermixing the molten steel and molten slag with sufficient intimacy to bring about a quick deoxidation of the steel, and allowing the steel to separate from the slag.

26. The process of deoxidizing steel, which comprises forming a molten bath of steel to be deoxidized, adding to the steel a metal of the class consisting of manganese and chromium in excess of that desired in the finished steel, and thereafter deoxidizing the steel by means of a fluid molten acid slag relatively poor in iron oxide.

27. A process for obtaining purified steel from oxidized steel which consists in adding manganese to said oxidized steel, then violently and intimately intermixing the steel to which said metal has been added with an acid slag until an appreciable amount of the oxides dissolved in the steel has been extracted, and then separating the slag from the steel.

28. A process for obtaining purified steel from oxidized steel which consists in adding chromium to said oxidized steel, then violently and intimately intermixing the steel to which said metal has been added with an acid slag until an appreciable amount of the oxides dissolved in the steel has been extracted, and then separating the slag from the steel.

29. The process of deoxidizing ferrous metals, which comprises forming a molten bath of the ferrous metal to be deoxidized, forming a bath of fluid molten acid slag relatively poor in iron oxide, causing an impact of the molten metal with the molten slag with such violence as to cause one to be dispersed into the other in a finely divided condition and form a turbulent mass of intimately intermixed slag and metal in order to bring about a speedy and intimate admixture of slag and metal and thereby quickly effect the deoxidation of the metal, and allowing the metal to separate from the slag.

30. The process of deoxidizing ferrous metals, which comprises forming a molten bath of the ferrous metal to be deoxidized, forming a bath of molten fluid acid slag relatively poor in iron oxide, and intermixing the slag and metal with such intensity and intimacy as to bring about immediately a substantially complete deoxidation of the metal.

31. The process of deoxidizing ferrous metals, which comprises forming a molten bath of the ferrous metal to be deoxidized, adding to such ferrous metal a metal of the class consisting of manganese and chromium in excess of that desired in the finished metal, forming a fluid molten acid slag relatively poor in iron oxide, quickly intermixing the molten metal and molten slag with sufficient intimacy to bring about a quick deoxidation of the metal, and allowing the deoxidized metal to separate from the slag.

32. The process of deoxidizing high melting point metals, which comprises forcibly bringing together a mass of the molten metal to be deoxidized and a mass of fluid molten deoxidizing slag with such violence that a turbulent mass of slag and metal is formed in which the slag is divided and dispersed throughout the metal, and allowing the metal to separate from the slag in the molten state.

33. The process of deoxidizing high melting point metals, which comprises forming a molten bath of the metal to be deoxidized, forming a bath of fluid molten deoxidizing slag, the temperature of the slag in relation to that of the metal being sufficiently high to prevent solidification of the metal, and bringing together the slag and metal with such intensity and intimacy as to bring about quickly a substantially complete deoxidation of the metal, and separating the metal in the molten state from the slag.

34. The process of deoxidizing steel, which comprises forming a molten bath of the steel to be deoxidized, forming a bath of fluid molten acid slag, and intermixing the slag and steel with such intensity and intimacy as to bring about immediately a substantially complete deoxidation of the steel.

35. The process of refining ferrous metals in an impure state by means of slag suited to the character of the impurities, characterized by the melting of the slag and the superheating of the same well above its melting point and by the simultaneous pouring of the impure metal and the molten superheated slag into a ladle so as to bring substantially all of the particles of the metal and slag immediately into intimate mixture with agitation so vigorous as to secure while the charge is resting in the ladle without the addition of further heat, a prompt and thorough inclusion of the impurities and the rising of such impurities with the highly heated liquid slag to the surface, and casting directly from the ladle the thus refined metal without further heating it.

RENÉ PERRIN.